Dec. 14, 1948.    J. STOECKLIN    2,456,541

DIFFERENTIAL RELAY

Filed Oct. 24, 1945

Inventor:

Josef Stoecklin.

By Pierce + Schaffler.

Attorneys.

Patented Dec. 14, 1948

2,456,541

UNITED STATES PATENT OFFICE 2,456,541

DIFFERENTIAL RELAY

Josef Stoecklin, Baden, Switzerland, assignor to Aktiengesellschaft Brown, Boveri & Cie, Baden, Switzerland, a joint-stock company of Switzerland Application October 24, 1945, Serial No. 624,189
In Switzerland October 28, 1944

5 Claims. (Cl. 175—294)

This invention relates generally to differential relay protective systems for transformers and the like, and it has particular relation to apparatus for preventing the false operation thereof on initial energization of the transformer.

Various arrangements have been provided to prevent the false operation of protective relays for transformers when the transformer is connected into the circuit. The primary purpose of these relays is to protect the transformer from the damage incident to an internal fault but certain of the operating conditions which exist on the occurrence of an internal fault are also present when the transformer is connected to the circuit for energization.

One manner of preventing false actuation on "switching in" is to lessen the sensitivity of the differential relay system. This can be accomplished by means of auxiliary contacts on the circuit breakers or switches.

It is also well known to employ certain characteristics of the direct current components in the magnetizing current or the higher harmonics in this current for rendering the differential protective system inoperative during the period that the transformer is being connected into the circuit. Various other arrangements have also been proposed for accomplishing this purpose but, in general, they have been unsatsifactory for various reasons. They have been complicated, have interfered with the functioning of the differential protective system on the occurrence of an internal fault, and have interfered with the proper functioning of the system when it should in fact operate.

An object of this invention is to prevent improper functioning of a differential relay protective system for a transformer or like inductive apparatus.

Another object is to close the tripping circuit for the switches or circuit breakers connecting the transformer in the circuit, only on the occurrence of an internal fault therein.

Still another object is to keep the tripping circuit open during the time when the transformer is being energized as the asymmetrical current then flowing would otherwise effect operation of the differential relay protective means.

A further object is to employ a current frequency foreign to the normal current frequency for effecting the neutralization of the differential relay protective means.

Other objects and advantages of this invention will in part be obvious and in part appear hereinafter.

The invention is disclosed in the embodiment thereof shown in the acompanying drawing and it comprises the features of construction, combination of elements, and arrangement of parts which will be exemplified in the constructions hereinafter set forth and the scope of the application of which will be indicated in the appended claims.

For a more complete understanding of the nature and scope of this invention, reference can be had to the following description taken together with the accompanying drawings, in which.

Figure 1:
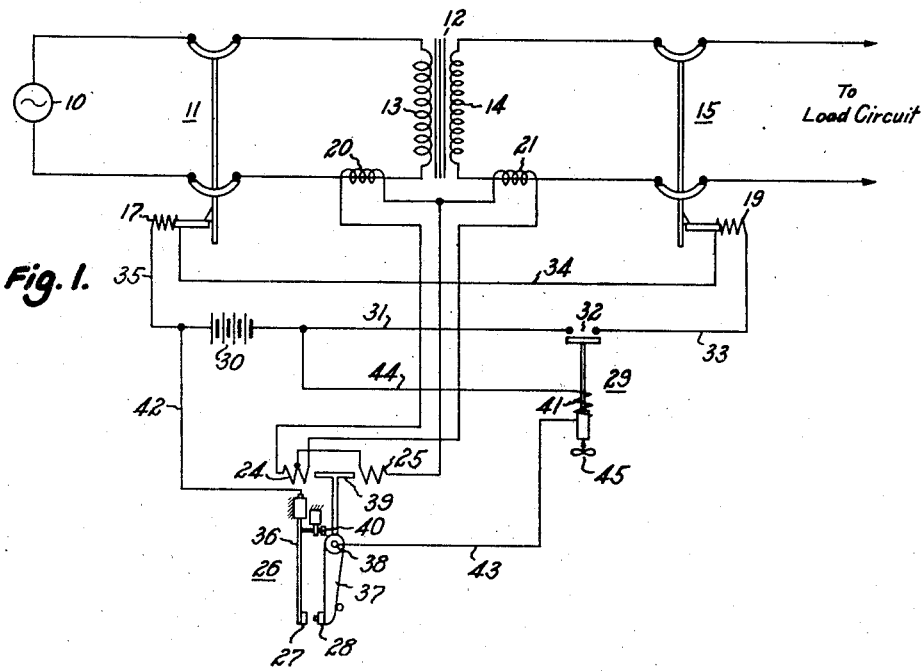
Fig. 1 illustrates, diagrammatically, one embodiment of the present invention as incorporated in a conventional differential relay system for a transformer.

Referring now particularly to Fig. 1, the reference character 10 designates an alternating current generator, such as a 60-cycle generator, which is connected by a switch or circuit breaker 11, to energize the power transformer 12 having a primary winding 13 and a secondary winding 14 which is connected by a switch or circuit breaker 15, to energize a load circuit as shown. Trip coils 17 and 19 are provided for the circuit breakers 11 and 15, respectively, to effect operation thereof to the open circuit position.

For convenience, the operating means for closing the circuit breakers 11 and 15 has not been shown since it forms no part of the present invention. While a single phase system has been illustrated, it will be understood that the invention is applicable to a polyphase system as well.

In accordance with the conventional practice, current transformers, shown generally at 20 and 21, are connected in opposed relation on opposite sides of the transformer 12. When the current flow to and from the transformer is the same, of course taking into consideration the ratio of transformation, then the voltage at the terminals of the current transformer 20 is equal and opposite to the voltage at the terminals of the current transformer 21. The current transformers 20 and 21 are connected to the windings 24 and 25 of a differential relay 26 having normally open contacts 27, 28 which when closed, serve to connect by way of an auxiliary relay 29 a current source, such as battery 30, to energize the trip windings 17 and 19. This circuit may be traced from the battery 30 through conductor 31, contacts 32 of relay 29, conductor 33, coil 19, conductor 34, coil 17 and conductor 35 to the battery 30.

It will be understood that the contacts 27, 28 of the differential relay 26 should be closed only in the event of an internal fault in the transformer 12. This condition is indicated by an unbalance in the voltages at the terminals of the current transformers 20 and 21 with the result that sufficient current flows through the coil 25 to close the contacts 27, 28. Such unbalance may occur however during the period when the transformer 12 is being energized as by the closure of circuit breaker 11. It is to prevent this improper tripping of the circuit breaker 11 that the present invention is particularly addressed.

Figure 2:
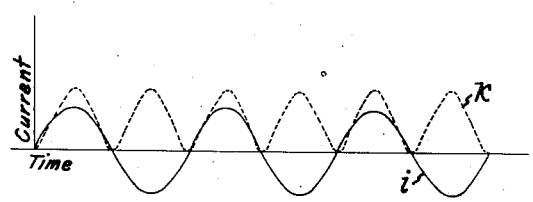
Figs. 2 and 3 are time-current curves which show graphically certain operating characteristics of the system.
Figure 3:
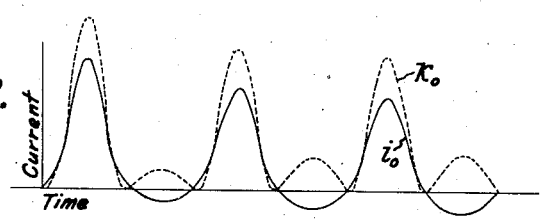

Reference is now made to the curves shown in Figs. 2 and 3 of the drawings. In Fig. 2 a few cycles of normal current $i$ are shown, it being assumed that the waves are sinusoidal in form. An electromagnet or coil energized by this current exerts a force proportionate to the square of this current as shown by the broken line curve $k$, the force $k$ having a repetition rate double that of the system frequency. On the other hand, the current resulting from circuit closing of the transformer may be unsymmetrical, as shown by the curve $i_0$ of Fig. 3. The square of this current is shown by a superimposed wave, as indicated by the broken line curve $k_0$. The force $k_0$ of an electromagnet or coil energized under these conditions is therefore alternately large and small. The ratio is such that the small impulses can be disregarded for all practical purposes when compared with the larger impulses. Therefore, while the power impulses occur with double the system frequency under normal current conditions, they are of the system frequency during the period that the transformer 12 is being energized. Advantage is taken of this fact in the control arrangement shown in Figure 1 which will now be described.

The control system includes the differential relay already referred to and indicated generally by the reference numeral 26, this relay being rendered inoperative when the current waves of the power circuit depart from their normal substantially symmetrical form. For this purpose one contact arm of the relay 26 is a spring member having an inherent frequency of vibration other than the current wave frequency, i. e. other than 120 cycles per second in the case of a 60 cycles per second alternating current distribution system. In the illustrated embodiment, the relatively stationary contact arm 36 is a flat spring member carrying a contact 27 for cooperation with a contact 28 on arm 37 which is pivoted on a shaft 38 and has an extension or equivalent armature means 39 actuated by the relay coil 25. The mechanical tuning of the spring arm 36 may be coarse, or the tuning may be damped by an adjustable set screw 40 to respond to a frequency band including the normal power circuit frequency, i. e., a frequency of one-half that of the positive and negative halves of the current wave of the power distribution system.

The contacts 27, 28 of the differential relay 26 are in series in the energizing circuit of the coil 41 of the relay 29; the energizing circuit including the current source 30, lead 42, contacts 27, 28 of relay 26, lead 43, coil 41 and the return lead 44. The switch or contacts 32 of the auxiliary relay 29 are in series in the lead 31 of the tripping circuit controlled by the main differential relay 26. A suitable time delay mechanism 45 is incorporated in the relay 29 to delay the restoration of the tripping circuit to operative condition after it is opened, by relays 26 and 29, when the energizing circuit of the transformer 12 is closed.

In the event of a transformer fault, a current $i$ of the normal power circuit frequency flows in the differential circuit and energizes the coil 25 of the differential relay 26. The movable contact arm 37 of relay 26 is rocked clockwise by a strong force resulting from current waves of double the power circuit frequency, and contacts 27, 28 engage under a relatively heavy pressure, thereby affording a substantially continuous energization of relay 29 to close the switch 32 in the tripping circuit, so that the tripping coils 17, 19 are thereby energized to trip the circuit breakers 11 and 15. The protective system thus functions in the normal manner to isolate the power transformer 12 in the event of a fault in the transformer.

The tripping circuit is not energized, however, by transient differential currents resulting from the closing of the circuit breaker 11 to energize the power transformer 12. The differential current $i_0$ in such event is not symmetrical but consists for all practical purposes in current waves of the power circuit frequency. The force $k_0$ that tends to close the contacts of relay 26 is thus more intermittent and of the frequency of mechanical vibration of the resilient contact arm 36. Arm 37 and its contact 28 rebounds from the resilient arm 36 and contact 27 during intervals between the major pulses of the asymmetrical current $i_0$, and the resilient contact arm 36 is set in vibration at its natural frequency. The relay 29 is therefore intermittently energized by short current pulses when the contacts 27, 28 of relay 26 are periodically closed, but because of the vibration of contact 27 at the system frequency these highly intermittent current pulses do not develop a sufficient force in the coil 41 of relay 29 to overcome the effect of the retarding mechanism 45 on the armature of this relay with the result that the armature on this relay does not pull completely in. The relay switch 32 in the tripping circuit therefore does not close, and the energization of the main relay 26 by the differential current due to a closing of the transformer circuit does not effect an energization of the tripping circuit.

Since certain further changes can be made in the foregoing constructions and different embodiments of the invention can be made without departing from the spirit and scope thereof, it is intended that all matter shown in the accompanying drawing and described hereinbefore shall be interpreted as illustrative and not in a limiting sense.

I claim:

1. A device for protecting alternating current power apparatus including inductively coupled windings subject to transient magnetizing currents such as transformers and the like, and which are connected and disconnected from the power system by a circuit breaker having an electro-responsive tripping device therefor, said protective device comprising, a trip relay controlling energization of the circuit containing the tripping device of the circuit breaker, said trip relay having a delay closing characteristic, and an energizing circuit for said trip relay controlled jointly by contact means of a differential relay energized in accordance with the respective current flows in the inductively coupled windings of the power apparatus and by contact means of an electro-mechanical vibration contactor resonant at the frequency of the power system and operated therefrom.

2. A protective device as defined in claim 1 wherein said mechanical vibration system is coarsely tuned to resonance over a narrow band of frequencies bracketing the frequency of the power source.

3. A protective device as defined in claim 2 and which further includes an adjustable damping device for determining the band of frequencies over which said vibration system is resonant.

4. A protective device as defined in claim 1 wherein said mechanical vibration system is constituted by a pair of contact members, one of which is carried by a spring arm resonant at the frequency of the power system.

5. A protective device as defined in claim 1 wherein said mechanical vibration system is constituted by a spring arm resonant at the frequency of the power system and which arm carries a contact cooperative with the movable contact member of said differential relay.

JOSEF STOECKLIN.

REFERENCES CITED

The following references are of record in the file of this patent:

UNITED STATES PATENTS

| Number | Name | Date |
| --- | --- | --- |
| 1,898,752 | Wellings | Feb. 21, 1933 |
| 1,927,794 | Fallou | Sept. 19, 1933 |